July 24, 1934.   W. B. DAMSEL   1,967,466
FLEXIBLE PIPE COUPLING
Filed June 20, 1930
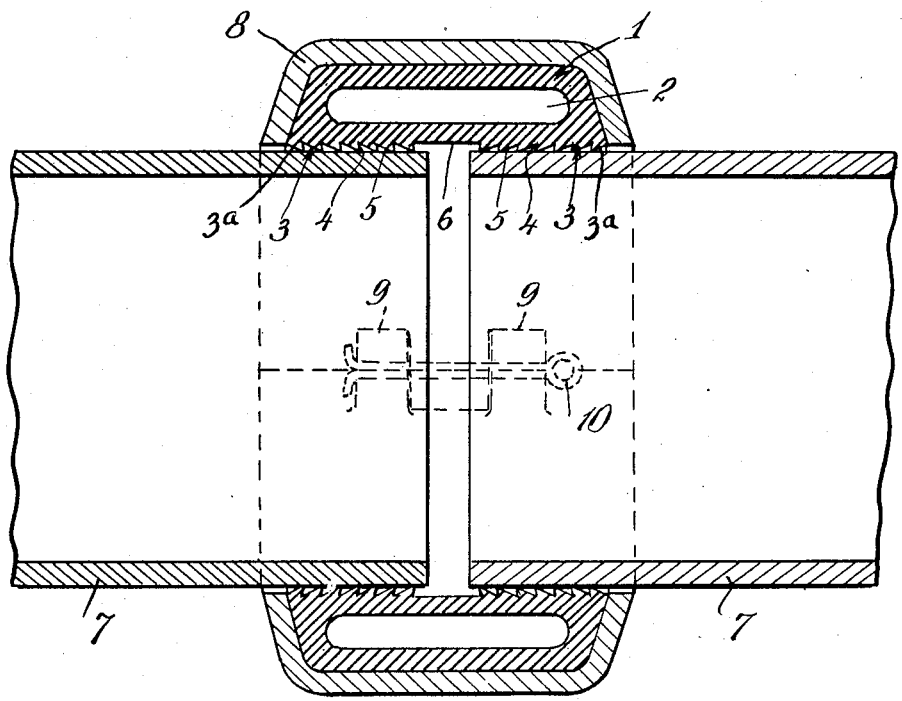
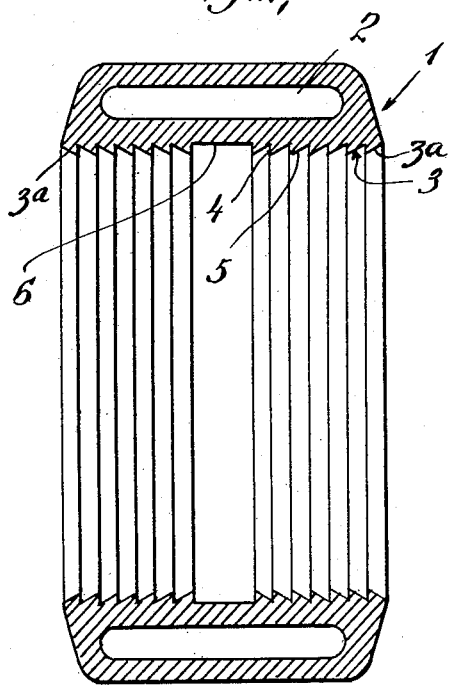
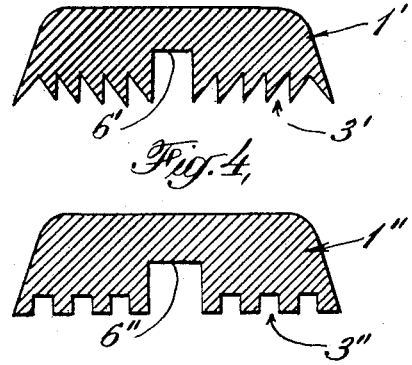
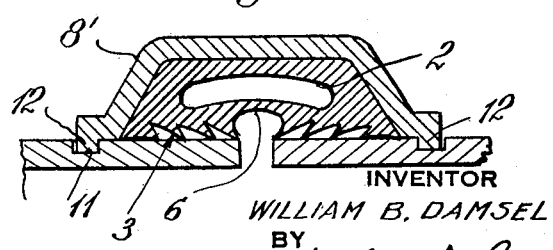
INVENTOR
WILLIAM B. DAMSEL
BY Walter J. Gill,
ATTORNEY Patented July 24, 1934

1,967,466

UNITED STATES PATENT OFFICE 1,967,466

FLEXIBLE PIPE COUPLING

William B. Damsel, New York, N. Y., assignor to James Henry Hayes, New York, N. Y.

Application June 20, 1930, Serial No. 462,547

3 Claims. (Cl. 285—194)

This invention relates to flexible pipe couplings and more particularly to those of the type in which the adjacent ends of the sections of a pipe-line are connected by rings of resilient material, each of which has a pair of inturned edges which embrace the ends of the pipes and an annular chamber between the edges in communication with the interior of the pipe-line whereby the fluid pressure therein maintains the edges of the ring in engagement with the pipe with sufficient force to prevent leakage, while at the same time permitting variations in the axial alignment of the sections of the pipe-line and expansion and contraction thereof. The rings are held in place upon the adjacent ends of the pipe sections by clamping members or housings.

While the effectiveness of rings of the type described above has been demonstrated beyond question in numerous installations, it has been found that in some cases and with certain fluids in the pipe-lines there is deterioration or breakdown of the rings, so that their sealing effect is lost and leakage from the pipe-line results.

It is a general object of this invention to overcome the above disadvantages of such types of pipe couplings by providing a resilient ring having a plurality of independent seals so that if one is attacked by the fluid within the pipe-line or by any substance in the fluid, another one of the seals will effectively prevent leakage, because it is segregated from the attacked seal and therefore retains its resiliency.

This object, as well as others which will hereinafter appear, is attained by forming the ring with two series of inwardly extending spaced annular projections or flanges which grip the outer surfaces of adjacent pipe sections near their ends along a plurality of spaced circumferential lines. Between the series of projections the ring is formed with an annular groove in communication with the pipe-line so that the pressure therein forces the projections against the pipe to maintain the seals formed by the spaced projections. All of the seals except the innermost one of each series are initially segregated from contact with the fluid in the pipe-lines so that they retain their resiliency until called into use by break-down of the inner seal.

By increasing the number of such seals they serve the dual purpose of more effectively sealing the joint between the pipes and more firmly gripping the ends of the pipes, thus making possible the use of pipes having plain surfaces, although the invention is equally adapted for use with pipes having grooved ends. In either case the ring is held in place upon the ends of the pipe sections by a multi-part clamping ring or housing. The resulting joint is not deleteriously affected by vibration or longitudinal expansion or contraction of the pipes joined by the coupling.

A further object of the invention is to provide in connection with the ring described above an arrangement for taking further advantage of the pressure within the pipe-line to more effectively make the coupling leak proof where such pressure is relatively high.

The particular nature of the invention will appear most clearly from a description of certain preferred embodiments thereof as shown in the accompanying drawing in which:

Fig. 1 is a longitudinal sectional view of one form of coupling in place upon the ends of two pipe sections, Fig. 2 is a similar view of the ring element of Fig. 1, Fig. 3 is a cross-sectional view of a portion of a modified form of ring, Fig. 4 is a similar view of a further modification, and Fig. 5 is a cross-sectional view of a portion of a form of ring similar to that shown in Figs. 1 and 2 illustrating the behavior of the ring under relatively high pressure.

Referring particularly to Figs. 1 and 2, 1 designates the packing ring which is formed of rubber or any other resilient material which will not be affected by the fluid in the pipes between which it is placed. The body of the ring is provided with an annular cavity 2. The inner face of the ring is provided with two series of inwardly extending spaced annular projections or flanges 3, the inner faces 4 of which are, when the ring is free, substantially perpendicular to the axis of the ring and the outer faces 5 of which are inclined to the axis. The space between the innermost projections forms an annular groove 6.

The diameter of the internal arris 3ª at each end of the ring is normally greater than the diameter of the inner edges of the projections and the latter diameter is slightly less than the external diameter of the pipes 7 with which the ring is to be used, so that when the ends of abutting pipes are inserted into the ring, as shown in Fig. 1, the projections will grip the outer surface of the pipes along a plurality of spaced circumferential lines and their faces 4 will be deflected inwardly to an extent depending upon the relative internal diameter of the edges of the projections and the external diameter of the pipe. The pipes are inserted with a space between their ends to provide communication with the groove 6 in the ring.

The ring 1 is clamped upon the ends of the pipes by a two-part housing 8 provided on one side with coacting lugs 9 through which a cotter pin 10 is passed, thus forming a hinge between the parts of the housing. The opposite side of the housing may be provided with opposed lugs for the reception of a bolt, or any other suitable fastening means may be employed. As such arrangements are well known, this feature of the device is omitted from the illustration for the sake of simplicity.

In assembling the coupling described above, the adjacent ends of the pipes 7 are inserted in the ring 1 to substantially the extent indicated, so as to leave the annular groove 6 in communication with the pipe-line whereby the pressure therein forces the projections 3 lying adjacent to the groove more firmly into engagement with the surface of the pipes than they are held by being of lesser internal diameter than the external diameter of the pipes.

If for any reason the first projection fails as a seal, the leakage of fluid between it and the surface of the pipe will cause sealing pressure to be applied to the next projection, which if it gives out will permit the third projection to perform the sealing function and so on for as many projections as deterioration may extend.

The ring is held upon the pipes by the housing 8, the bolt (not shown) of which is tightened to the required degree. In other respects the coupling functions as do previous devices of this character insofar as they permit variation in longitudinal alignment and expansion or contraction of the pipes.

In Fig. 3 a modified form of packing ring 1' is shown in which the annular cavity 2 of Fig. 2 is omitted and the annular groove 6' between the inwardly extending projections 3' is relatively deeper than in the groove of Fig. 2. The advantage of this deeper groove is that it causes a greater deflection of the projections and therefore is particularly adapted for use in pipe-lines in which an excessive pressure exists. A further modification is shown in Fig. 4 in which the projections 3'' are of rectangular cross-section instead of triangular form as are those of Figs. 2 and 3. The act of inserting the ends of the pipes into this form of ring deflects the projections slightly inwardly so that under the effect of line pressure in the groove 6'' they will form seals corresponding in function to the seals formed by the triangular shaped projections.

In Fig. 5, there is shown the general appearance of a ring of the type shown in Fig. 2 when subjected to excessive pressure which forces out the wall of the annular groove 6 and bends the cavity 2, thus causing the projections 3 to become more deflected than in Fig. 1 which shows the appearance of the ring when there is no substantial pressure in the pipe line. This increased deflection provides a greater area of contact between the flanges and the surface of the pipe to provide a more effective seal for the greater pressure in the pipe line. Fig. 5 also shows a housing 8 adapted for use with pipes provided with grooves 11 near their ends. In this case the housing is provided with side flanges 12 adapted to fit within the grooves with sufficient clearance to permit expansion or contraction as well as deflection of the pipes.

While certain preferred embodiments of the invention have been disclosed it will be understood that it may be embodied in other forms and that various changes in details of construction may be made without departing from the principle of the invention as defined in the appended claims.

I claim:

1. A ring for a pipe coupling having an annular cavity in its body, two series of inwardly extending spaced annular projections and an annular groove between the series of projections.

2. A ring for a pipe coupling having two series of inwardly extending spaced annular projections, the inner faces of which are substantially perpendicular to the axis of the ring and the outer faces inclined with respect thereto and an annular groove between the series of projections.

3. In a coupling for connecting two pipes, the combination of a resilient ring having an annular cavity in its body and two series of inwardly extending spaced annular projections and an annular groove between the series of projections adapted to be in communication with the pipe-line when the coupling is in place with the projections gripping the outer surfaces of the adjacent ends of the pipes and means for retaining the ring in place upon the pipes.

WILLIAM B. DAMSEL.